US011857493B2

(12) United States Patent
Laemmle et al.

(10) Patent No.: US 11,857,493 B2
(45) Date of Patent: Jan. 2, 2024

(54) BLISTER PACK FOR MEDICINAL PRODUCTS AND TOOL FOR PRODUCING THE BLISTER PACK

(71) Applicant: Uhlmann Pac-Systeme GmbH & Co. KG, Laupheim (DE)

(72) Inventors: Kurt Laemmle, Ehingen (DE); Christian Link, Baustetten (DE); Peter Rafensteiner, Laupheim (DE); Martin Seiffert, Schelklingen (DE); Michael Schultes, Ehingen (DE); Detlev Gertitschke, Braunschweig (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 270 days.

(21) Appl. No.: 17/196,074

(22) Filed: Mar. 9, 2021

(65) Prior Publication Data

US 2021/0186807 A1 Jun. 24, 2021

Related U.S. Application Data

(62) Division of application No. 16/521,888, filed on Jul. 25, 2019, now Pat. No. 11,446,205.

(30) Foreign Application Priority Data

Jul. 26, 2018 (EP) .................................... 18185814

(51) Int. Cl.
*A61J 1/03* (2023.01)
*B65D 75/36* (2006.01)
*B65B 47/04* (2006.01)

(52) U.S. Cl.
CPC ............... *A61J 1/035* (2013.01); *B65B 47/04* (2013.01); *B65D 75/36* (2013.01)

(58) Field of Classification Search
CPC .. B65D 81/267; B65D 81/266; B65D 75/367; B65D 75/36; A61J 1/035
(Continued)

(56) References Cited

U.S. PATENT DOCUMENTS 3,343,897 A * 9/1967 Pierre .................. B65D 75/367 206/439
6,050,400 A * 4/2000 Taskis .................. B65D 81/266 206/467
(Continued)

FOREIGN PATENT DOCUMENTS

CN 1946609 A 4/2007
DE 1544098 A1 1/1971
(Continued)

OTHER PUBLICATIONS

International Search Report dated Jan. 25, 2019.

*Primary Examiner* — Steven A. Reynolds
(74) *Attorney, Agent, or Firm* — Dickinson Wright PLLC

(57) ABSTRACT

The blister pack for medicinal products comprises a bottom film in which blister pockets are formed, which are surrounded by webs of the bottom film. The blister pockets comprise a two-level shape with a first recess and second recess situated lower down. A lidding film is sealed to the webs of the bottom film and to a strip of active material, which is arranged in each blister pocket. The medicinal product is accommodated in the second recess, and the strip of active material is accommodated in the first recess. The first recess comprises, in a bottom area thereof, a peripheral rib, which extends around the second recess, or at least two projecting knobs, which are arranged next to the second recess, wherein the strip of active material rests on the rib or on the knobs.

10 Claims, 20 Drawing Sheets

(58) Field of Classification Search
USPC .................................................. 206/204, 581
See application file for complete search history.

(56) References Cited

U.S. PATENT DOCUMENTS

| | | | | |
|---|---|---|---|---|
| 6,279,736 | B1 * | 8/2001 | Hekal | F26B 21/083 428/35.8 |
| 11,337,890 | B2 * | 5/2022 | Kibele | A61J 1/035 |
| 11,396,413 | B2 * | 7/2022 | Voellmicke | B65D 81/266 |
| 2002/0112449 | A1 | 8/2002 | Heath et al. | |
| 2010/0300924 | A1 | 12/2010 | Kaplan et al. | |
| 2020/0016034 | A1 * | 1/2020 | Voellmicke | B65D 75/327 |

FOREIGN PATENT DOCUMENTS

| | | | |
|---|---|---|---|
| EP | 2511075 | A1 | 10/2012 |
| WO | 2005095216 | A1 | 10/2005 |
| WO | 2011052422 | A1 | 3/2013 |

* cited by examiner

BLISTER PACK FOR MEDICINAL PRODUCTS AND TOOL FOR PRODUCING THE BLISTER PACK

RELATED APPLICATIONS

This application is a divisional application from U.S. Ser. No. 16/521,888, filed Jul. 25, 2019, which claims priority to European Patent Application No. 18 185 814.3, filed on Jul. 26, 2018, entitled "Blister Pack for Medicinal Products and Tool for Producing the Blister Pack", the contents of which are incorporated herein by reference in their entirety.

FIELD

The disclosure relates to a blister pack for medicinal products, in particular tablets, capsules, or sugar-coated pills, and to a tool for producing the blister pack.

BACKGROUND

Blister packs for medicinal products usually consist of a bottom film, into which a plurality of blister pockets are formed, which are then filled with medicinal products, and of a lidding film. The lidding film is sealed to the bottom film and thus closes the blister pockets, so that the medicinal products in the pockets can be protected during storage.

For certain medicinal products, it can also be necessary to provide an insert of active material in the area of the blister pocket. This material can serve, for example, to dry the air present in the sealed pocket and thus to ensure the integrity of the medicinal products. Inserts of active material are usually placed in a chamber connected to the blister pocket before the pocket is sealed with the lidding film.

The additional inserts of active material, however, increase the amount of space which blister packs of this type occupy. In addition, the inserts of active material must be introduced into chambers of relatively complex shape in the blister pockets, so that they will not fall out of the blister pocket when the blister pocket is squeezed by the user, who might then unintentionally ingest the insert. This complicates the production process.

BRIEF SUMMARY

It is an object of the present disclosure to provide a blister pack of the simplest possible configuration for medicinal products with an active material in the area of the pocket of the blister pack and to provide a blister pack which takes up only a small amount of space and can be handled safely, and to provide a corresponding tool for producing a blister pack of this type.

According to an aspect of the disclosure, the blister pack for medicinal products, in particular tablets, capsules, or sugar-coated pills, comprises a bottom film, in which at least one blister pocket is formed, the blister pocket being surrounded by webs of the bottom film. The at least one blister pocket comprises an at least two-level shape with a first recess, which defines a first level of the blister pocket, and a second recess, which is arranged in a subsection of the two-dimensional area over which the first recess extends and is situated lower down than the first recess. A lidding film covers the at least one blister pocket and is sealed to webs of the bottom film. A strip of active material is arranged in the at least one blister pocket and is sealed to the lidding film. The medicinal product is accommodated in the second recess, and the strip of active material is accommodated in the first recess. In a bottom area, the first recess comprises a peripheral rib, which extends around the second recess, or at least two projecting knobs, which are arranged next to the second recess, wherein the strip of active material rests on the rib or on the knobs.

With this configuration, the blister pack is easy to manufacture. It also offers the advantage that there is a secure bond between the strip of active material and the lidding film in the area of the sealing points and guarantees that the user will be able to use the blister pack without making a mistake.

The rib is, or the knobs are, preferably an integral part of the bottom film. Thus the structure of the blister pack is as simple as possible. Another advantage is that the rib or the knobs can be formed in the bottom film at the same time as the blister pockets during the production process.

In preferred embodiments, the rib is rounded at the top or the knobs have a flat plateau surface. As a result, an effective support surface for the strip of active material is obtained, which, during the sealing operation, exerts a force, counter to that of the upper sealing tool, on the strip of active material and the lidding film. The support surface for the strip of active material preferably has relatively small dimensions, so that the counterpressure produced by the rib or by the knobs is exerted over a relatively small area, as a result of which the bond between the lidding film and the strip of active material is especially strong in the area of the sealing point.

In an especially preferred embodiment, the strip is a section of a film and comprises a thickness of 0.2-2 mm, and more preferably of 0.3-1.2 mm. Such a thin film is advantageous in reducing the space requirement but at the same time is thick enough to ensure the reliable handling of the strip during the production process.

The rib has, or the knobs have, advantageously a height in the range of 0.5-5 mm, preferably of 1-3 mm. This produces a gap of sufficient size between the medicinal product and the strip of active material.

It is preferred that the active material, as a result of its material properties, has an absorption function for absorbing at least one substance or a release function for releasing at least one substance. Thus, depending on the requirements of the medicinal product, the integrity of the product can be ensured over a long period of time.

In a preferred embodiment, precisely two knobs are provided, which are arranged on opposite sides of the second recess. In this case, the connection between the strip of active material and the lidding film is limited to the minimum of precisely two sealing points. These two sealing points are accordingly especially long-lasting.

In one possible embodiment, the strip of active material is arranged transversely to the medicinal product.

In one embodiment, the strip of active material comprises an opening, which is arranged above the medicinal product. As a result, the medicinal product can be pressed through the recess and out of the blister pocket.

According to an aspect of the disclosure, the tool for producing a blister pack for medicinal products, in particular tablets, capsules, or sugar-coated pills, comprises at least one trough for forming or receiving at least one blister pocket of the blister pack. The at least one trough comprises an at least two-level shape with a first recess, which defines a first level of the trough, and a second recess, which is arranged in a subsection of the two-dimensional area over which the first recess extends and is situated lower down than the first recess. In a bottom area, the first recess can comprise an upright peripheral projection, which extends around the second recess; at least two upright projections a certain distance apart, which are arranged next to the second recess; at least one upright, movable support element, which extends around the second recess; or at least two upright movable pins a certain distance apart, which are arranged next to the second recess.

With a tool configured in this way, the shape of a blister pack described above can be produced easily and reliably. This embodiment pertains, first, to a forming tool for forming a corresponding contour of the blister pockets, and, second, to a sealing tool, in which the lidding film and the strip of active material can be sealed together at predefined sealing points in an especially reliable manner.

In preferred embodiments, the projection or projections or the support element or the pins comprise a rounding or a flat plateau area at the apex or at the tip.

In a preferred embodiment, precisely two projections or pins are provided.

It is also preferred that several projections be present and that the projections be of equal height, preferably in the range of 0.5-5 mm, more preferably of 1-3 mm. Alternatively, several pins can be present, and the pins can be extended in such a way that they project equally far beyond the bottom area of the first recess, preferably by 0.5-5 mm, more preferably by 1-3 mm.

In one embodiment, a support element or several pins are present, and the support element or the pins are spring-loaded.

DETAILED DESCRIPTION

Figure 1:
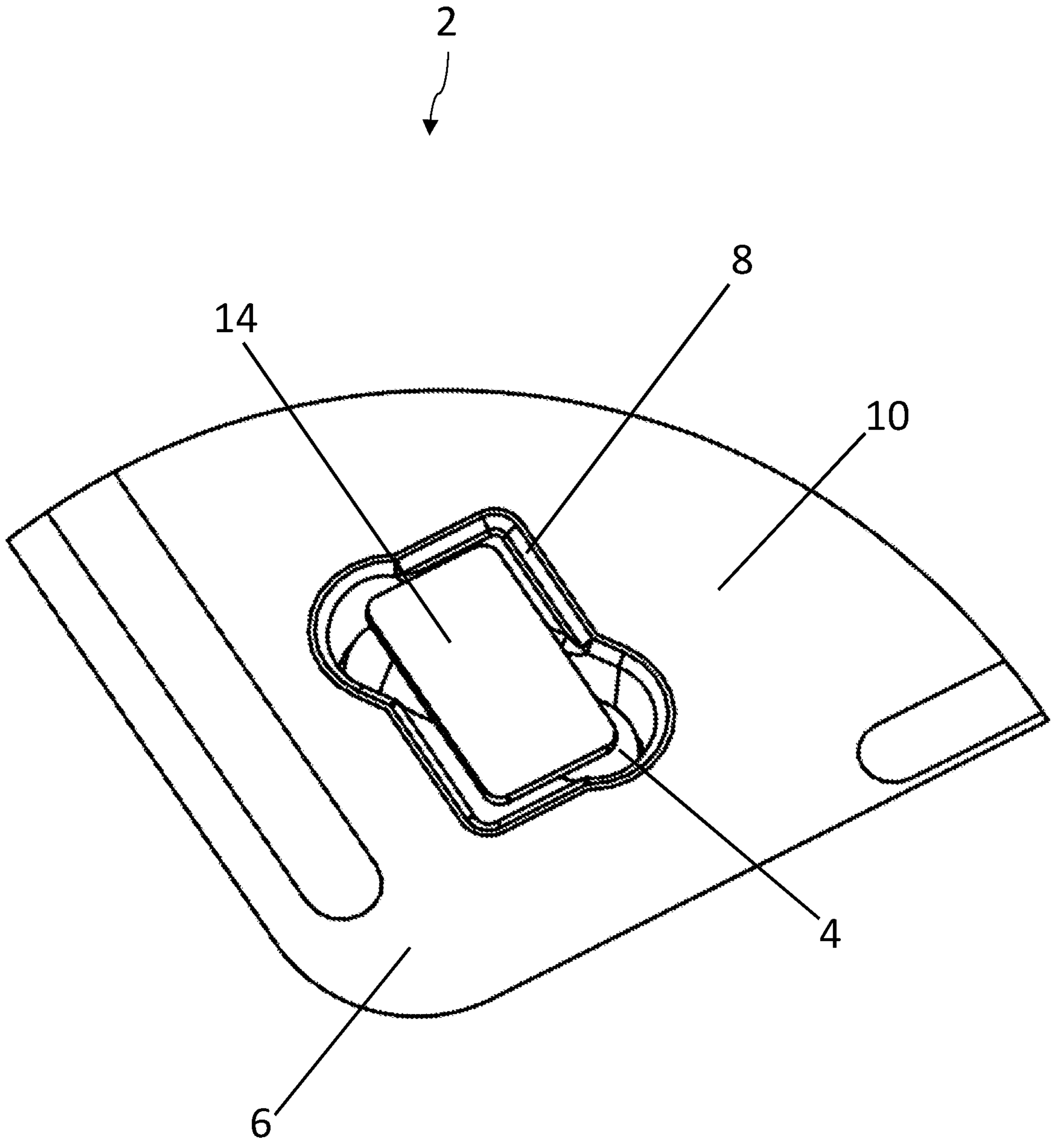
FIG. 1 is a perspective view of part of one embodiment of a blister pack according to the disclosure, in which the lidding film has been omitted for the sake of clarity.
Figure 2:
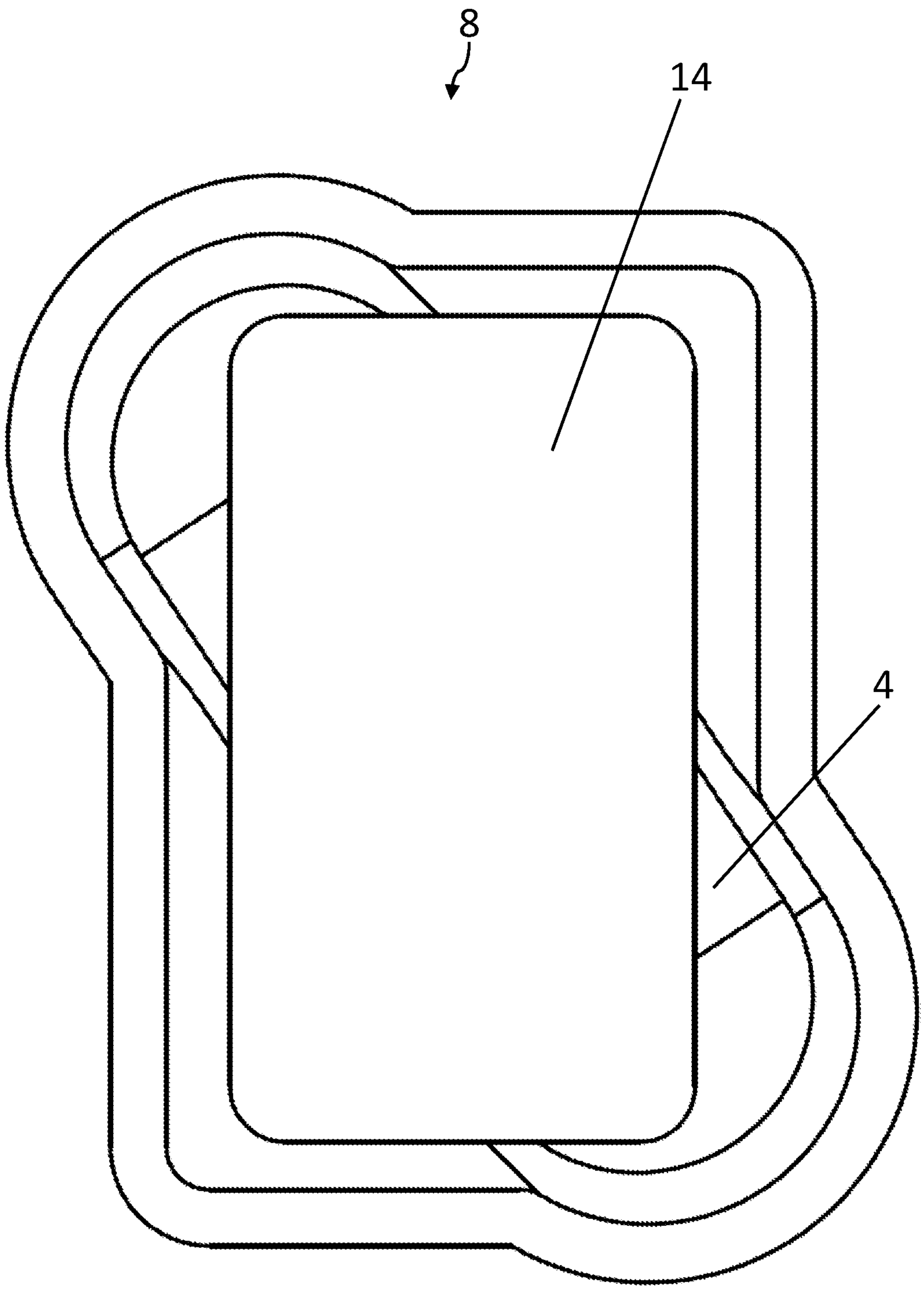
FIG. 2 is a top view of a blister pocket of the blister pack of FIG. 1, where the lidding film has been omitted for the sake of clarity.
Figure 3:
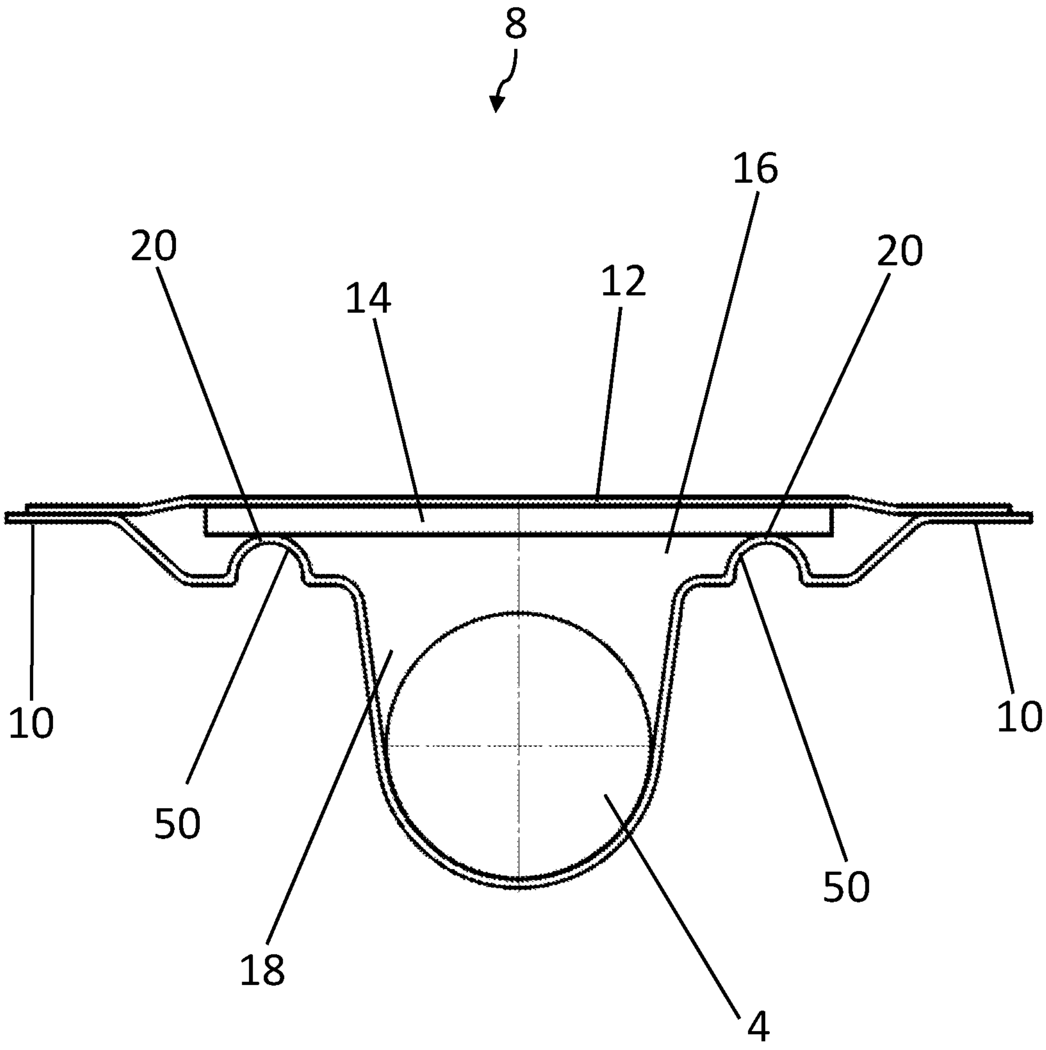
FIG. 3 is a cross-sectional view of a blister pocket of the blister pack of FIG. 1.

FIGS. 1-3 show a first embodiment of a blister pack 2 according to the disclosure for medicinal products 4, in particular tablets, capsules, or sugar-coated pills. The blister pack 2 comprises a bottom film 6, in which at least one blister pocket 8 is formed, which is surrounded by webs 10 of the bottom film 6. The part of the blister pack 2 shown in FIG. 1 has only one blister pocket 8. Blister packs 2 usually comprise a plurality of blister pockets 8, which are usually distributed in a regular pattern across the blister pack 2. A frequently used arrangement of the blister pockets 8 in the blister pack 2 is a matrix of rows and columns.

A lidding film 12, which covers the at least one blister pocket 8, is sealed to the webs 10 of the bottom film 6 and closes off the at least one blister pocket 8. The lidding film 12 is shown only in FIG. 3, whereas it has been omitted in FIGS. 1 and 2 for the sake of clarity.

Materials which can be used for the bottom film include in particular PVC, PVDC, Aclar, aluminum, PETG, and laminated films. The material for the lidding film can be in particular aluminum, polyethylene, polypropylene, and paper-laminated films or composite films.

A strip 14 of active material is arranged in the at least one blister pocket 8 and is sealed to the lidding film 12. The seal to the lidding film 12 can extend across the entire surface area of the strip 14, over only certain parts of the surface of the strip, or along lines; or it can be present only at certain points.

As a result of its material properties, the active material generally comprises an absorption function for absorbing at least one substance or a release function for releasing at least one substance. The most widespread purpose for which the strip is used is to absorb moisture. In the case of strips 14 with an absorption function, however, the strips 14 of active material can also absorb oxygen, $CO_2$, reactive impurities, or odors, for example. In the case of strips 14 with a release function, the strips 14 of active material can release nitrogen or carbon dioxide, for example.

A strip 14 of active material preferably comprises a thickness in the range of 0.2-2 mm, and more preferably of 0.3-1.2 mm. The material of the strip 14 preferably has at least some stiffness, so that it can be easily handled. The material of the strip 14 is preferably a film, more preferably a polymer, and especially preferably a three-phase polymer. The film can be produced by extrusion, for example, wherein the active particles are added to the polymer. Channels within the polymer allow the movement of gases. The active particles are preferably present as spheres in the strip 14 of active material.

In the embodiment according to FIGS. 1-3, the product 4 is configured as an oblong shape, and the strip 14 of active material has a substantially rectangular base surface. The strip 14 is arranged transversely to the product 4, preferably at an angle of approximately 45°. Standard dimensions of the strip 14 in the longitudinal and transverse directions are in the range of approximately 5-50 mm.

As can be seen in FIG. 3, each blister pocket 8 comprises a two-level shape, in which a first recess 16 defines a first level of the blister pocket 8. A second recess 18 is arranged in a subsection of the two-dimensional area over which the first recess 16 extends and is situated lower down than the first recess 16. The medicinal product 4 is accommodated in the second recess 18, whereas the strip 14 of active material is accommodated in the first recess 16. The strip 14 of active material rests on support surfaces 20 of the first recess 16, which are arranged next to the second recess 18. The strip 14 and the product 4 are therefore preferably a certain distance apart in the vertical direction.

The two support surfaces 20 for the strip 14 of active material are located diametrically opposite each other on two sides of the second recess 18. The strip 14 of active material therefore covers a large part of the second recess 18, and two of its opposite corner areas rest on the support surfaces 20.

The support surfaces 20 for the strip 14 of active material are formed by two knobs 50 projecting upward from the bottom film 6 in the area of the first recess 16. The two knobs 50 can be seen only in the cross-sectional view according to FIG. 3, because they are covered by the strip 14 in the other two views.

Figure 4:
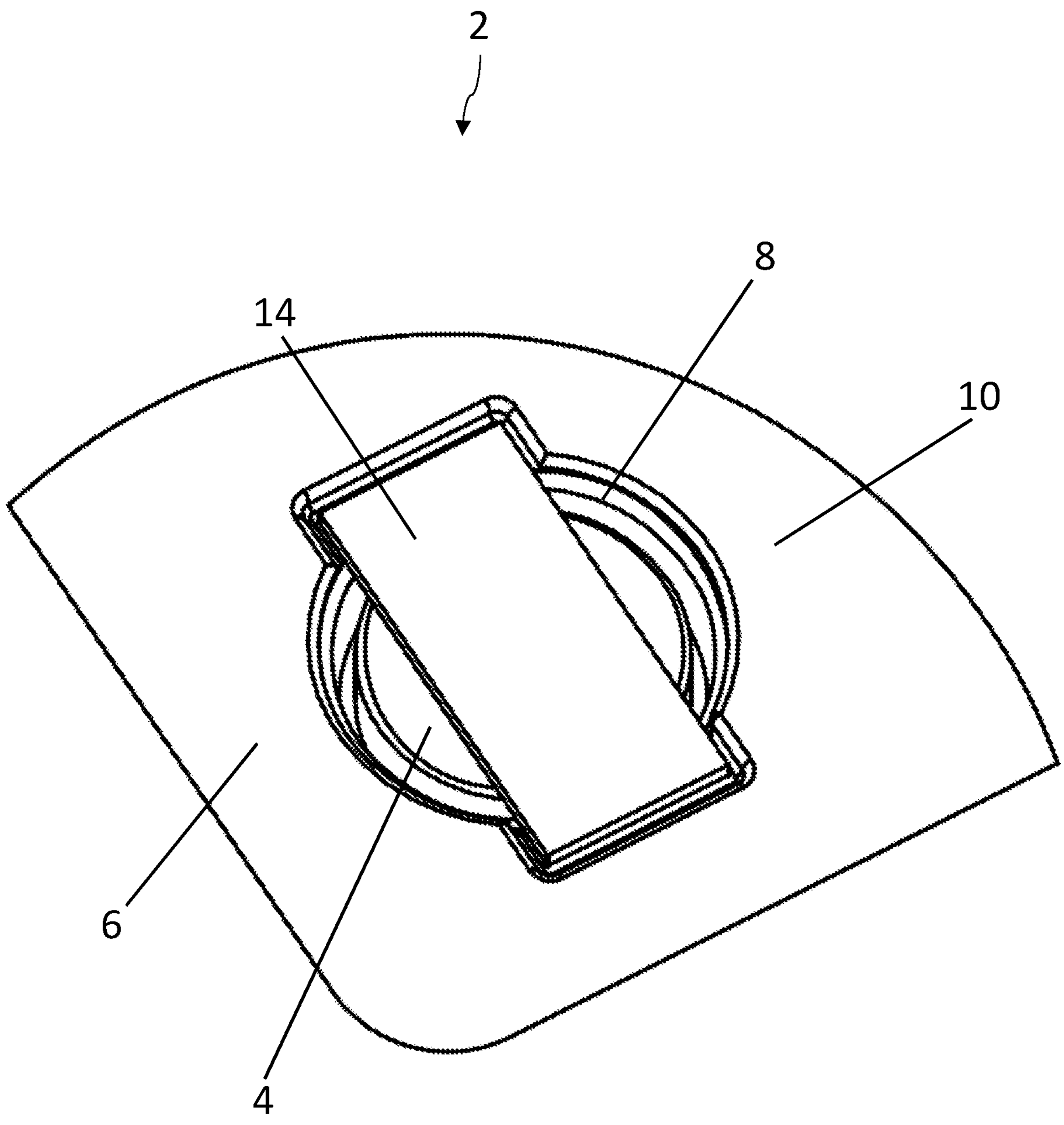
FIG. 4 is a perspective view of a part of another embodiment of a blister pack according to the disclosure, in which the lidding film has been omitted for the sake of clarity.
Figure 5:
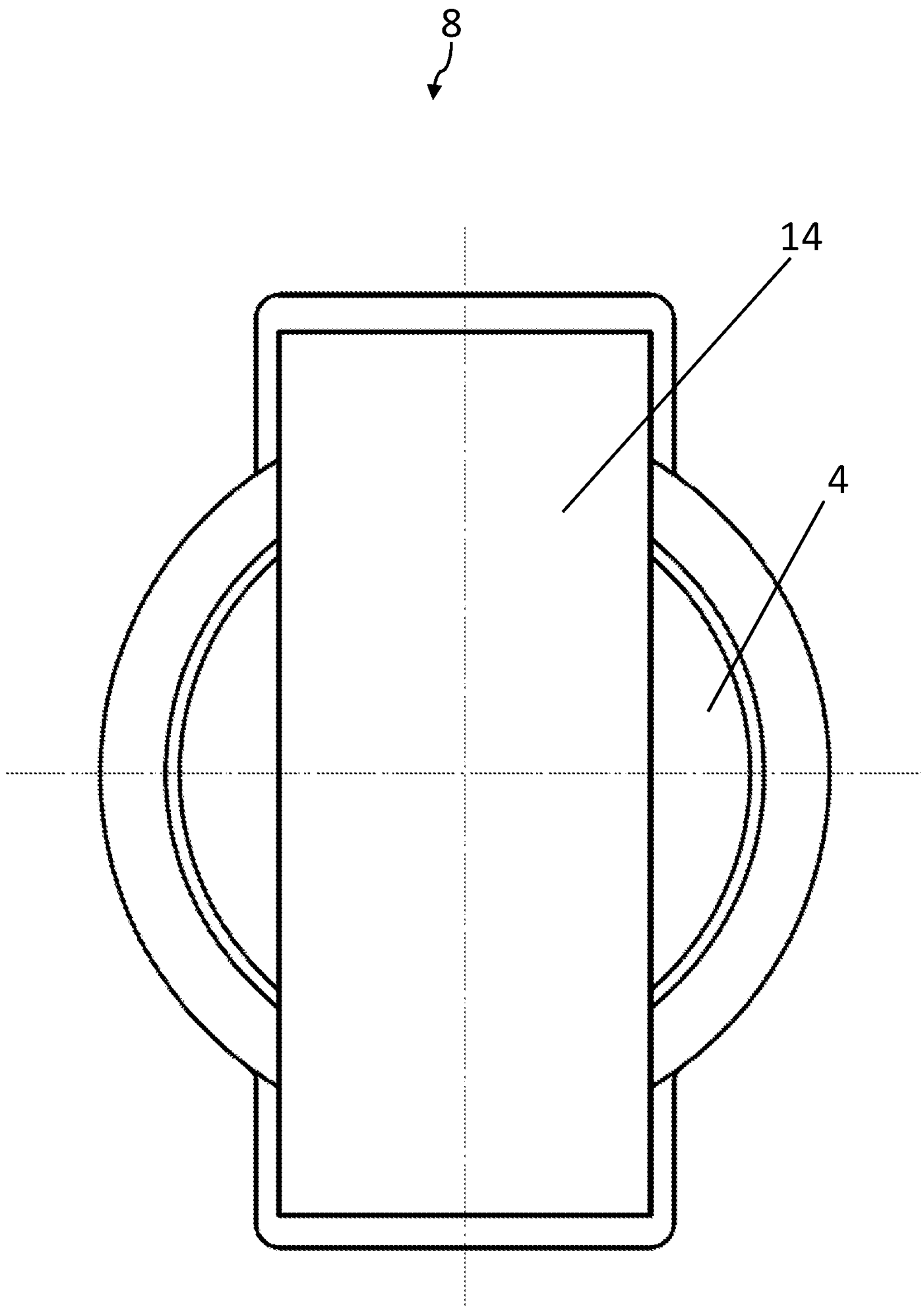
FIG. 5 is a top view of a blister pocket of the blister pack of FIG. 4, wherein the lidding film has been omitted for the sake of clarity.
Figure 6:
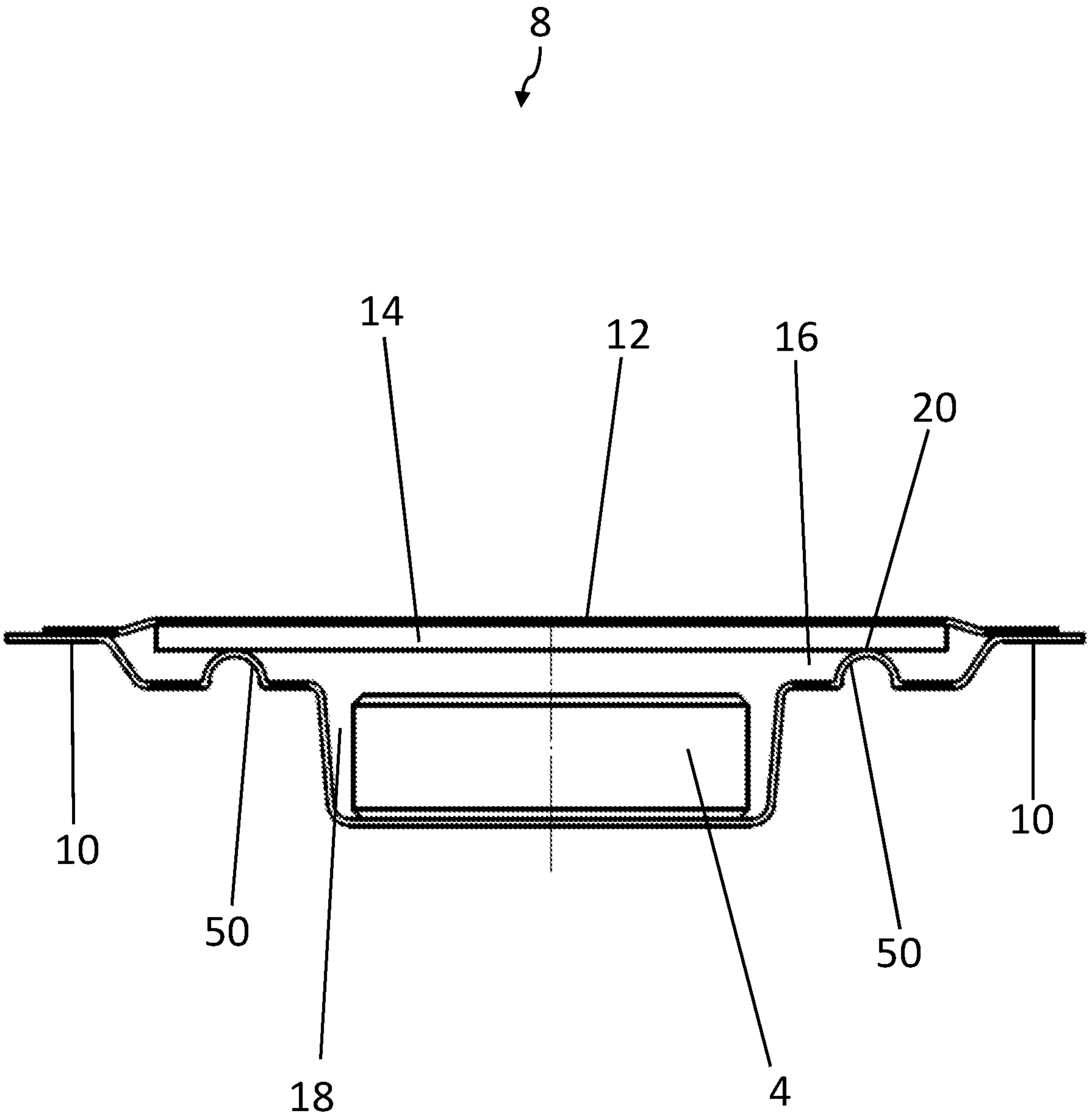
FIG. 6 is a cross-sectional view of a blister pocket of the blister pack of FIG. 4 with a sealed-on lidding film.

The embodiment of the blister pack 2 according to the disclosure shown in FIGS. 4-6 has a structure similar to that of the embodiment shown in FIGS. 1-3 and as previously described. Elements which are the same have been provided with the same reference numbers. In contrast to the embodiment of FIGS. 1-3, the medicinal product 4 has here a circular base surface. The strip 14 of active material again has a substantially rectangular base surface and rests by its two narrower edge areas on the support surfaces 20 of the knobs 50, which are arranged on opposite sides of the second recess 18. The strip 14 of active material therefore covers a large part of the product 4.

Figure 7:
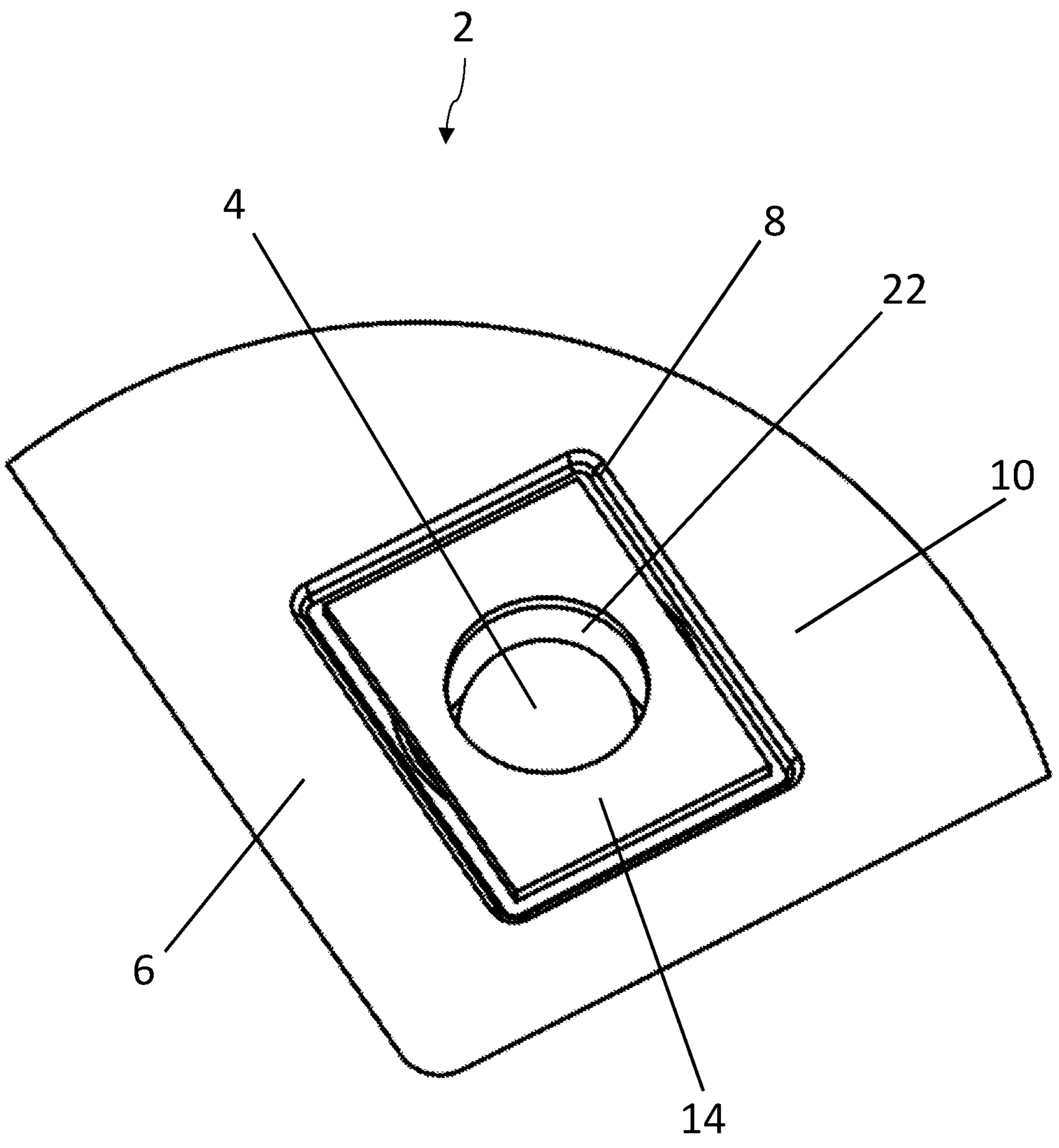
FIG. 7 is a perspective view of a part of another embodiment of a blister pack according to the disclosure, in which the lidding film has been omitted for the sake of clarity.
Figure 8:
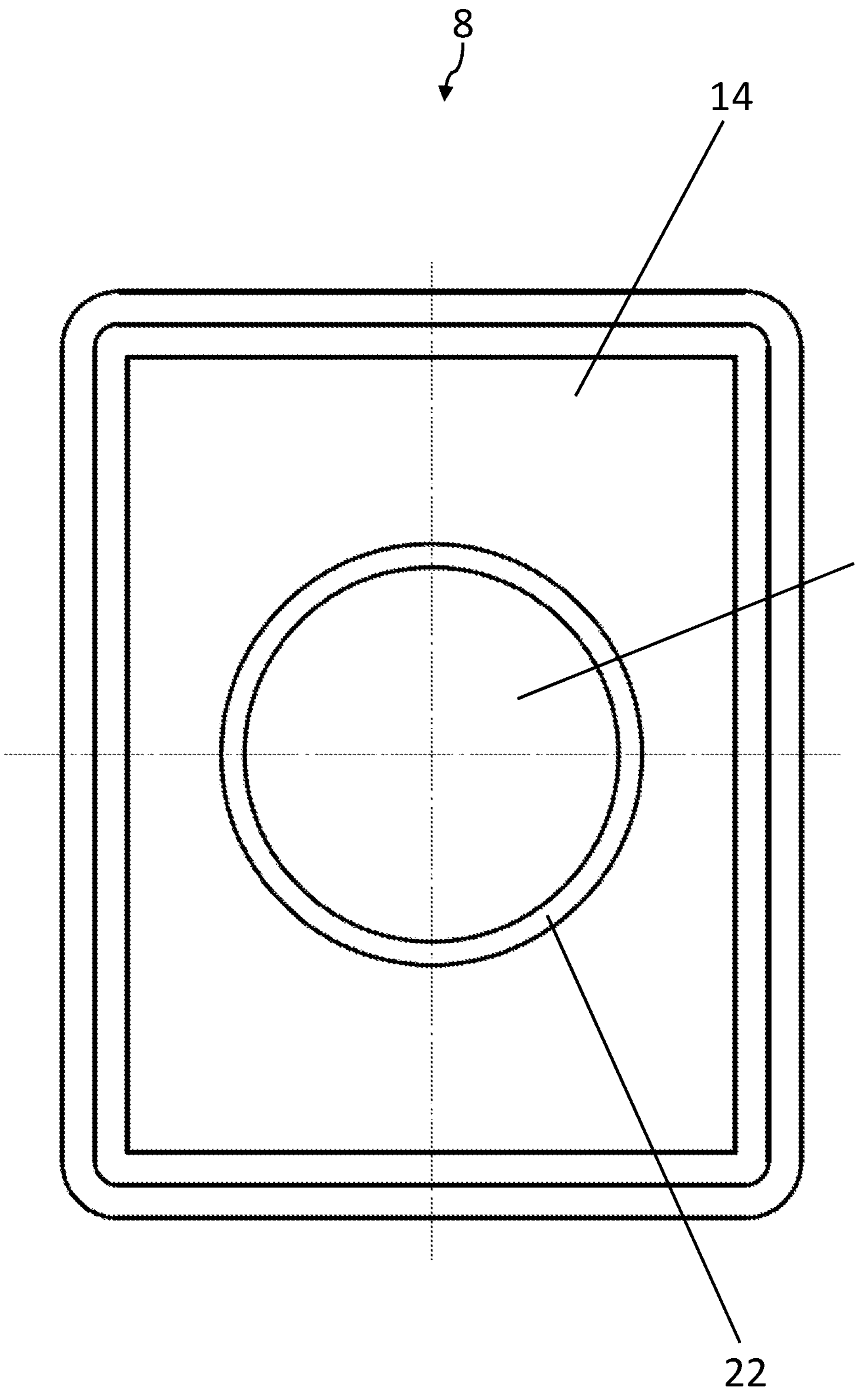
FIG. 8 is a top view of a blister pocket of the blister pack of FIG. 7, wherein the lidding film has been omitted for the sake of clarity.
Figure 9:
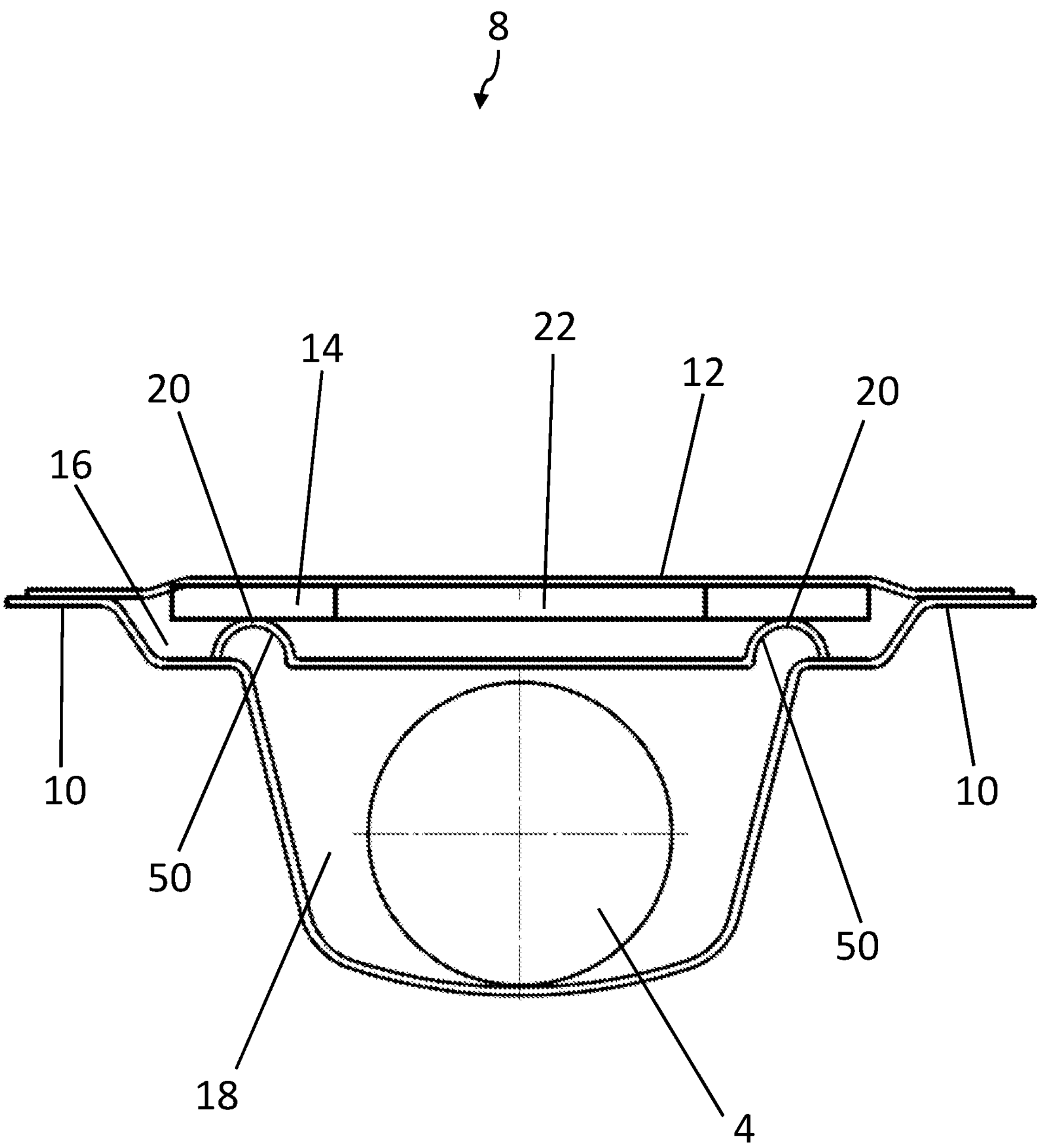
FIG. 9 is a cross-sectional view of a blister pocket of the blister pack of FIG. 7 with a sealed-on lidding film.

The embodiment of the blister pack 2 according to the disclosure shown in FIGS. 7-9 is again substantially the same as the embodiment according to FIGS. 1-3. Elements which are the same have been provided with the same reference numbers. The medical product 4 is in the form of a sphere. In contrast to the previously described embodiments, the strip 14 of active material has an opening 22, which is arranged above the medicinal product 4. The medicinal product 4 can therefore pass through the opening 22 of the strip 14 of active material when the blister pack is squeezed. The area of the lidding film 12 sealed to the strip 14 of active material is therefore not broken when the product 4 is squeezed out, but only the area of the lidding film 12 above the opening 22 is broken.

The shape of the blister pockets 8 can differ from the embodiments described so far. Any geometric configuration is conceivable as long as the blister pocket 8 has a shape with at least two levels. The shape of the second recess 18 depends preferably on the shape of the product 4 to be packaged, which can have any imaginable geometric shape. In addition to the previously mentioned oblong shape, pill shape, or spherical shape, it is also possible for a triangular or polygonal shape to be present.

Finally, the shape of the strip 14 of active material can also depart from the exemplary embodiments described above. The strips 14 can have, for example, a round, oval, or triangular base surface instead of the rectangular base surface illustrated above. In each of these embodiments, it is possible to provide an opening 22 in the strip. The strips 14 are usually cut-to-size blanks.

A knob 50 can be arranged on each of two opposite sides of the second recess 18, as shown in the previous exemplary embodiments. It is also possible, however, for more than two knobs 50 to be arranged around the second recess 18.

Figure 10:
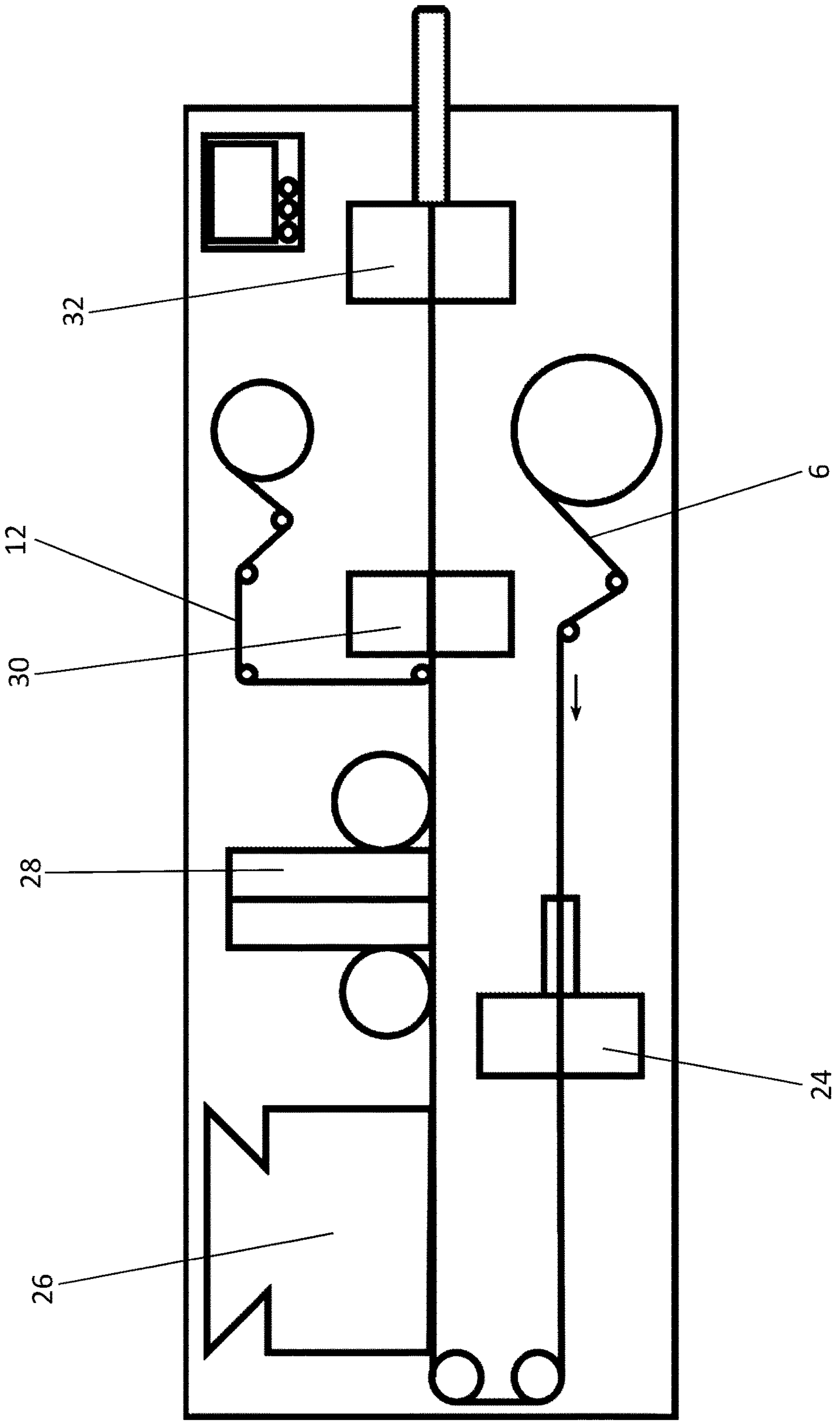
FIG. 10 is a schematic diagram of a unit for producing blister packs according to the disclosure.

A method for producing blister packs 2 according to the disclosure will now be described with reference to FIG. 10. First, a bottom film 6 is provided in the form of a roll and unwound. Blister pockets 8 are formed in the unwound bottom film 6 in a forming station 24, wherein each blister pocket 8 has the previously described shape with at least two levels. Then the second recesses 18 of the blister pockets 8 are filled with the medicinal products 4 in a filling station 26.

Strips 14 of active material are provided in a feed station 28, and a strip 14 of active material is placed in the first recess 16 of each blister pocket 8 on the support surfaces 20 of the knobs 50, above the medicinal product 4. The strip 14 of active material is thus preferably arranged above the medicinal product 4, preferably a short distance away from it. The strips 14 of active material are preferably provided by starting with a web of active material wound up into a roll and by stamping out the strips 14 of active material from the unwound web. The strips 14 of active material are preferably put in position by means of a pick-and-place machine. It is also possible, however, to use other means of transferring the strips 14 of active material.

In a following sealing station 30, the lidding film 12 is provided and sealed to the webs 10 of the bottom film 6. Simultaneously, the lidding film 12 is also sealed to the strips 14 of active material. All of these steps taken together, therefore, result in the formation of a sealed blister web. Finally, in a downstream stamping station 32, the individual blister packs 2 are stamped out of the blister web. The individual blister packs 2 are then sent on for additional processing steps.

Figure 11:
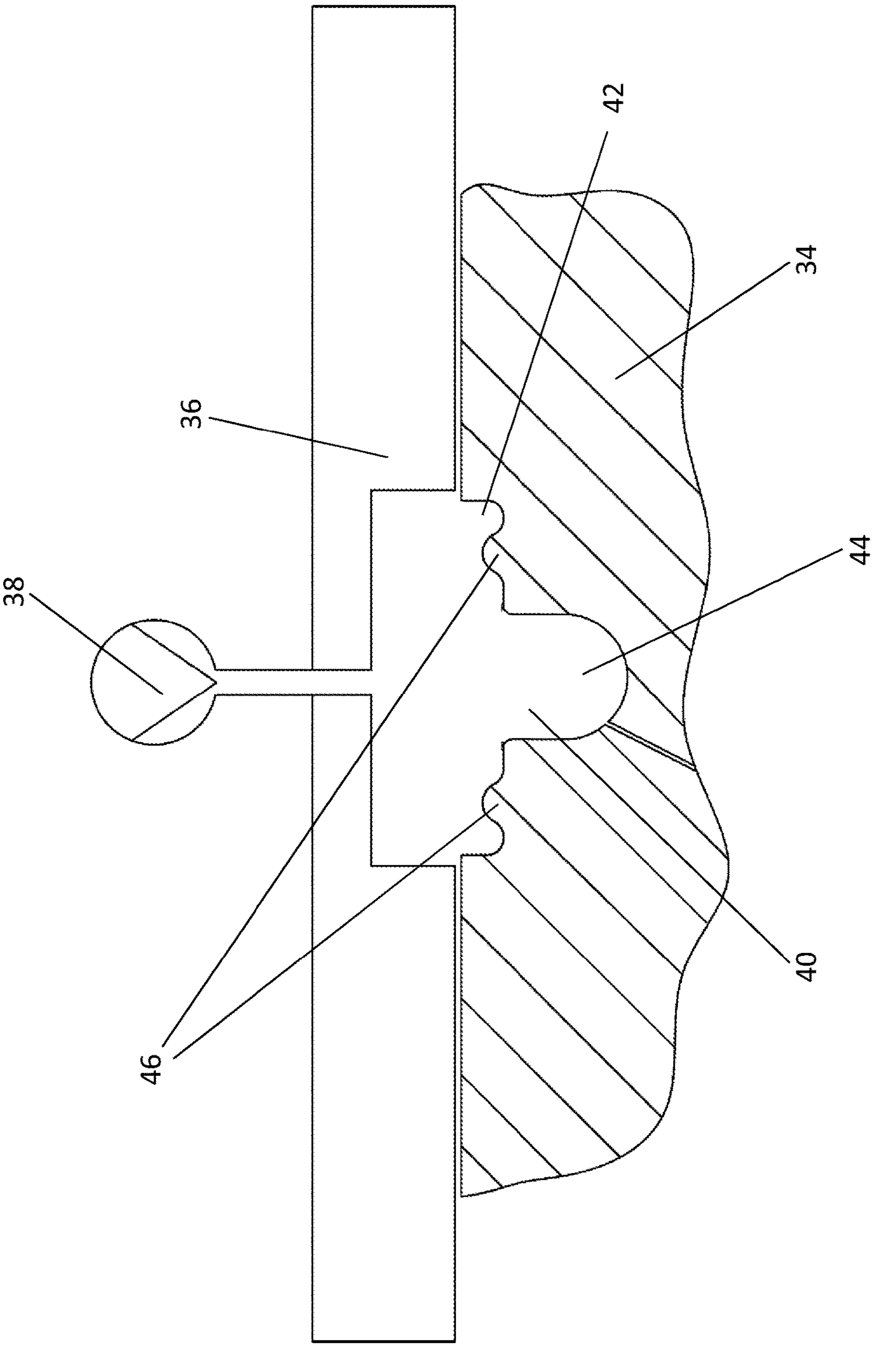
FIG. 11 is a schematic, cross-sectional view of a forming device with a tool according to the disclosure, which can be used to produce the blister packs.

FIG. 11 shows a first forming tool 34 according to the disclosure and a second forming tool 36, which cooperate in the forming station 24 to form the blister pockets 8 in the bottom film 6. The two forming tools 34, 36 are movable relative to each other between an opened position and a closed or forming position. For this purpose, at least one of the two forming tools 34, 36 must be movable, preferably both of them. In the closed or forming position, the two forming tools 34, 36 clamp the bottom film 6 between them for the forming process. A compressed-air source 38 is connected to the second forming tool 36 to bring about the formation of the blister pockets 8 in the tightly clamped bottom film 6.

The first forming tool 34 comprises at least one, preferably a plurality, of troughs 40 for forming at least one blister pocket 8 in the bottom film 6. The at least one trough 40 comprises an at least two-level shape. A first recess 42 of the trough 40 defines a first level of the trough 40. A second recess 44 of the trough 40 is arranged in a subsection of the two-dimensional area over which the first recess 42 extends and is situated lower down than the first recess 42.

Figure 12:
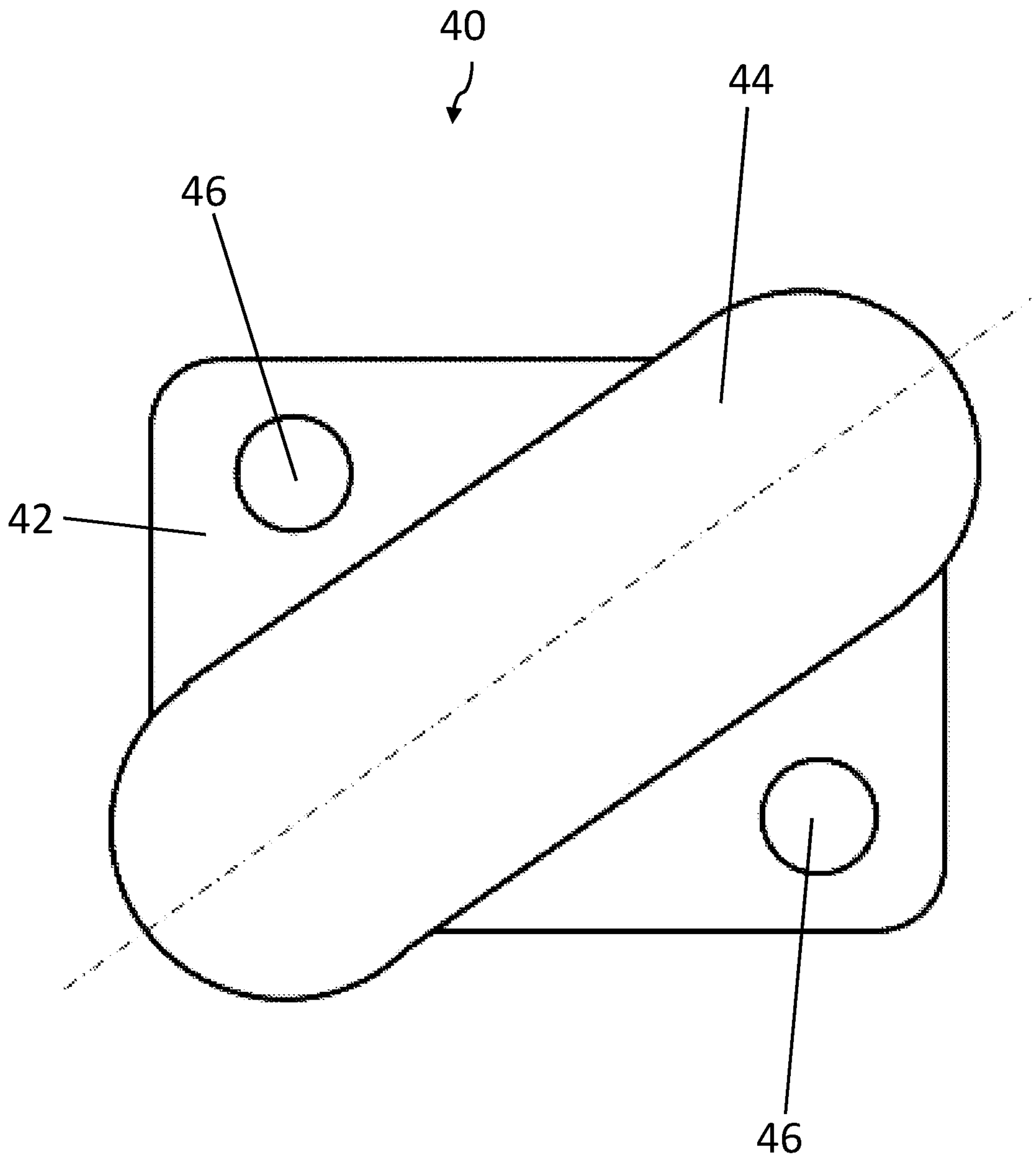
FIG. 12 is a top view of the recess in the lower forming tool of FIG. 11.

In the area of the first recess 42 of the trough 40, the first forming tool 34 comprises two upright projections 46, which are arranged next to the second recess 44. As a result, during the forming of the blister pockets 8 in the bottom film 6, the two upward-projecting knobs 50 are formed in the bottom film 6 and serve as support surfaces 20 for the strips 14 of active material. The two projections 46 can be seen again in the top view of FIG. 12. The shape of the trough 40 thus corresponds to the shape of the blister pockets 8 to be formed. The shape of the trough 40 shown in FIG. 12, for example, corresponds to the shape of the blister pockets 8 of the blister pack 2 of FIGS. 1-3.

Figure 13:
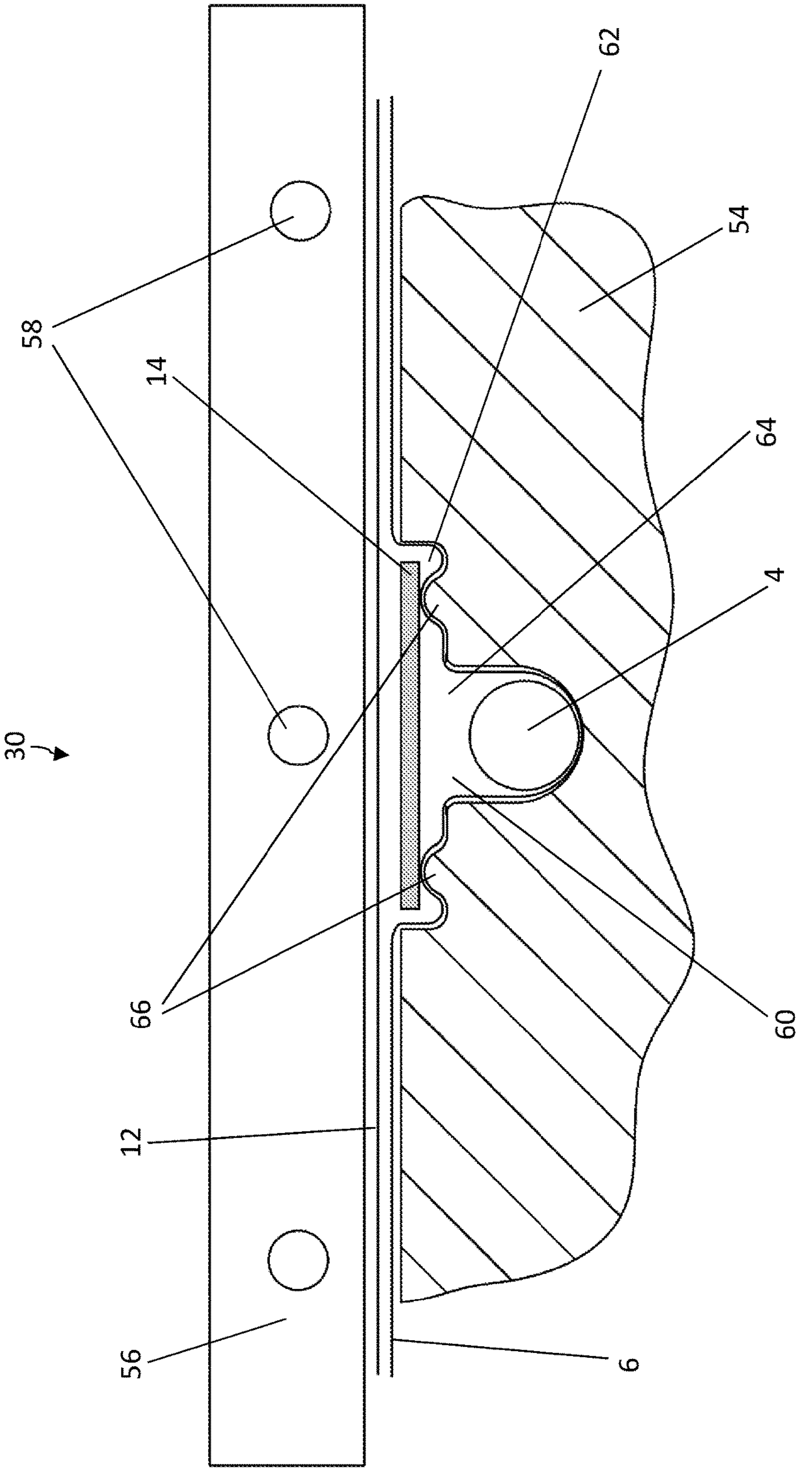
FIG. 13 is a schematic, cross-sectional view of a sealing device with a tool according to the disclosure, which can be used to produce the blister packs, in an opened position.
Figure 14:
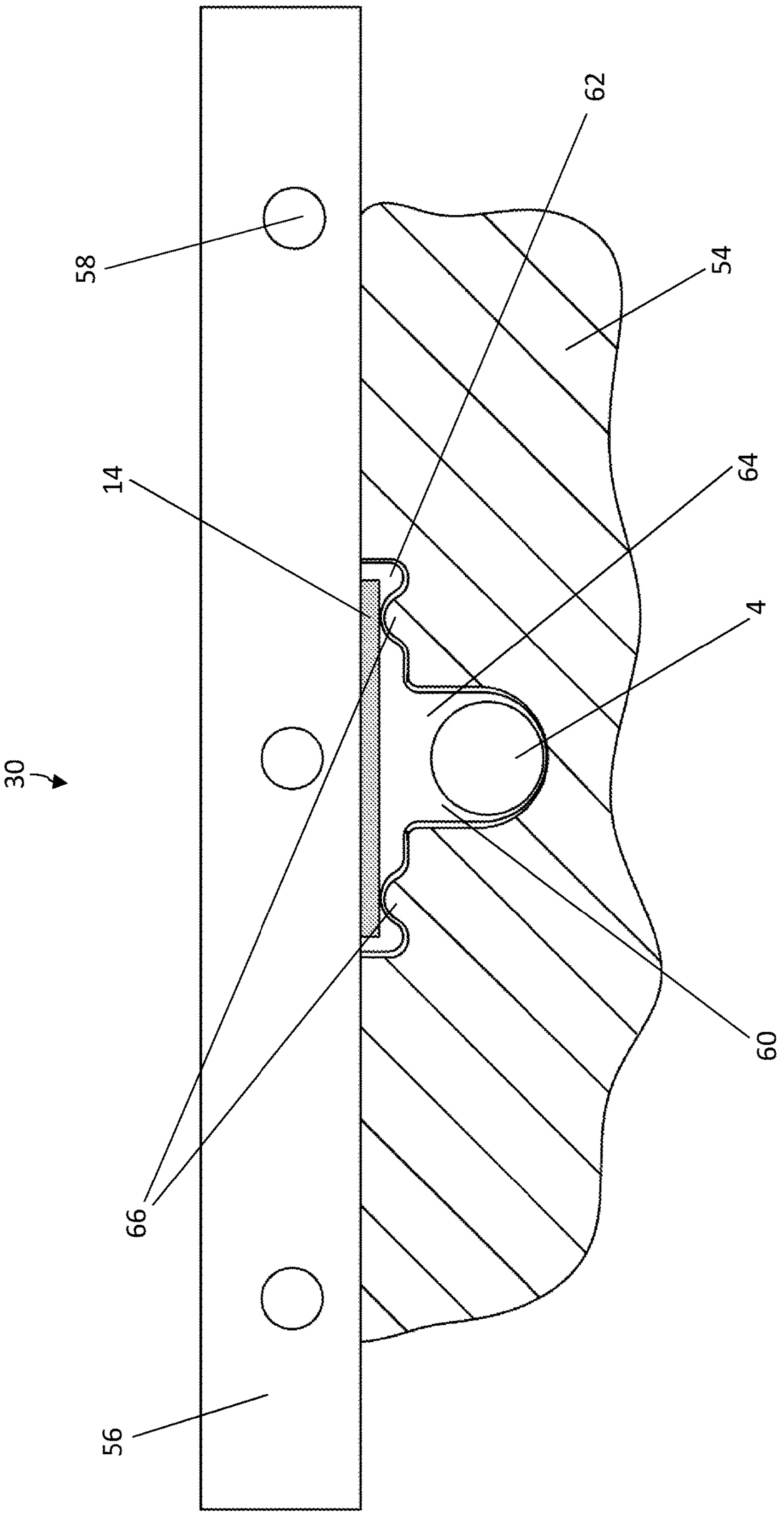
FIG. 14 is a schematic, cross-sectional view of the sealing device of FIG. 13 in a closed sealing position.

In FIGS. 13 and 14, a first sealing tool 54 according to the disclosure and a second sealing tool 56 are sketched, which cooperate in the sealing station 30 to seal the lidding film 12 to the webs 10 of the bottom film 6 and to the strips 14 of active material. The two sealing tools 54, 56 are movable relative to each other between an opened position (FIG. 13) and a closed position (FIG. 14). For this purpose, at least one of the two sealing tools 54, 56, preferably both of them, must be movable. In the closed sealing position, the two sealing tools 54, 56 press the lidding film 12 against the webs 10 of the bottom film 6 and against the strips 14 of active material. The second sealing tool 56 comprises at least one heating means 58. The first sealing tool 54 can comprise a cooling means (not shown).

The first sealing tool 54 comprises at least one, preferably a plurality, of troughs 60 for accommodating at least one blister pocket 8 of the bottom film 6. The at least one trough 60 comprises an at least two-level shape. A first recess 62 of the trough 60 defines a first level of the trough 60. A second recess 64 of the trough 60 is arranged in a subsection of the two-dimensional area over which the first recess 62 extends and is situated lower down than the first recess 62. The shape of the trough 60 corresponds substantially to the shape of the blister pockets 8 previously formed in the forming station 24. In this concrete example, the shape of the trough 60 corresponds to the blister pack of FIGS. 1-3.

The first sealing tool 54 comprises two upright projections 66, which correspond to the shape of the knobs 50 formed in the bottom film 6 and are arranged so that the knobs 50 come to rest on the projections 66 during the sealing process. The projections 66 serve to support the knobs 50 of the bottom film 6 during the sealing process.

When the strip 14 of active material is placed on the at least one support surface 20 of the first recess 16, it is advantageous for the strips 14 of active material to project above the webs 10 of the bottom film by an amount of 0.05-0.5 mm, more preferably of 0.08-0.2 mm. The geometry of the blister pockets 8 and of the knobs 50 in the first sealing tool 54 is accordingly to be adapted to the thickness of the strip 14 of active material, so that this excess projection is present before the sealing process in the sealing station 30. The excess projection of the strips 14 ensures that the lidding film 12 is sealed not only to the webs 10 of the bottom film 6 but also to the strips 14 of active material.

Figure 15:
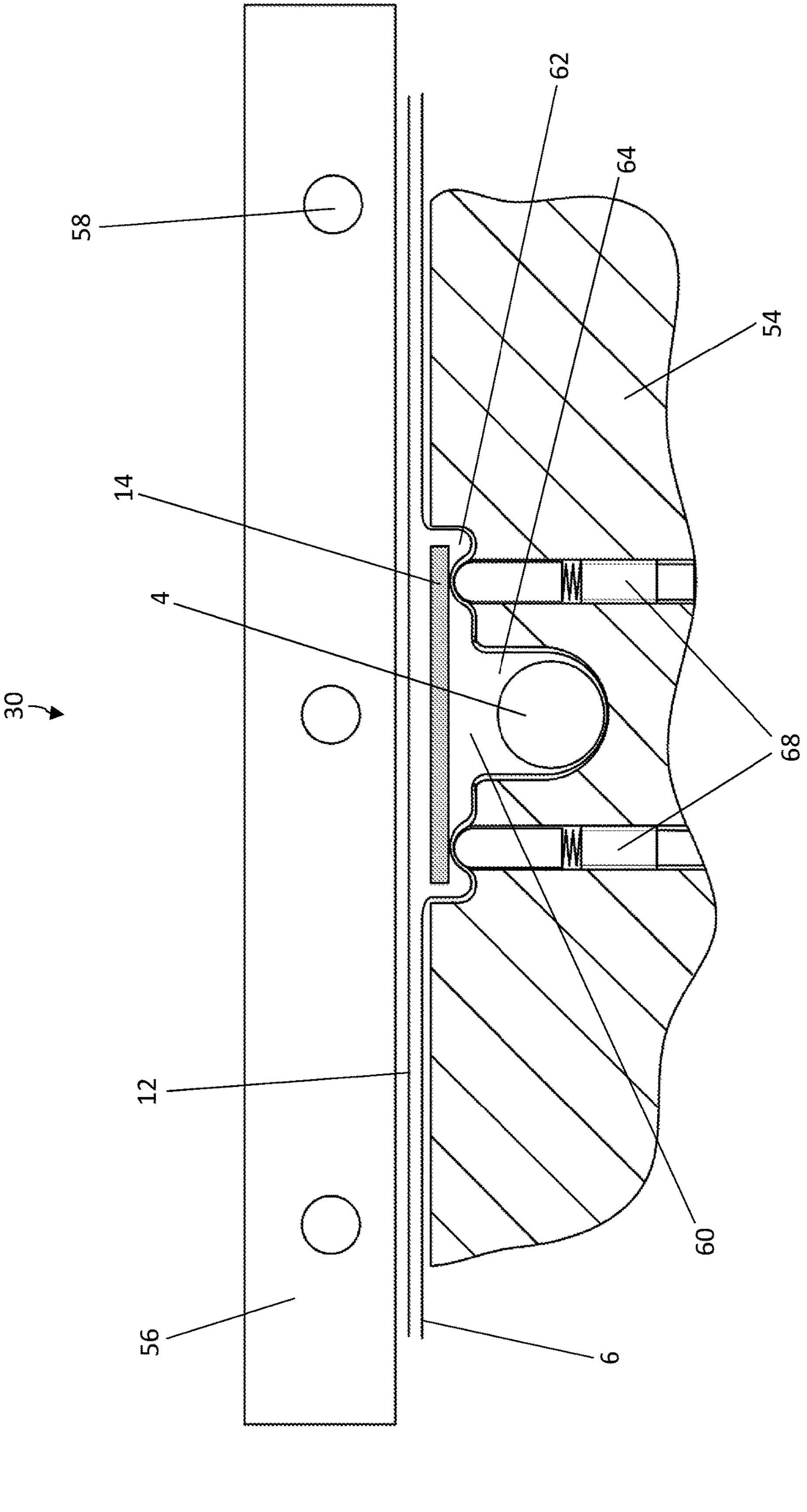
FIG. 15 is a schematic cross-sectional view of another sealing device with a tool according to the disclosure, which can be used to produce the blister packs, in an opened position.
Figure 16:
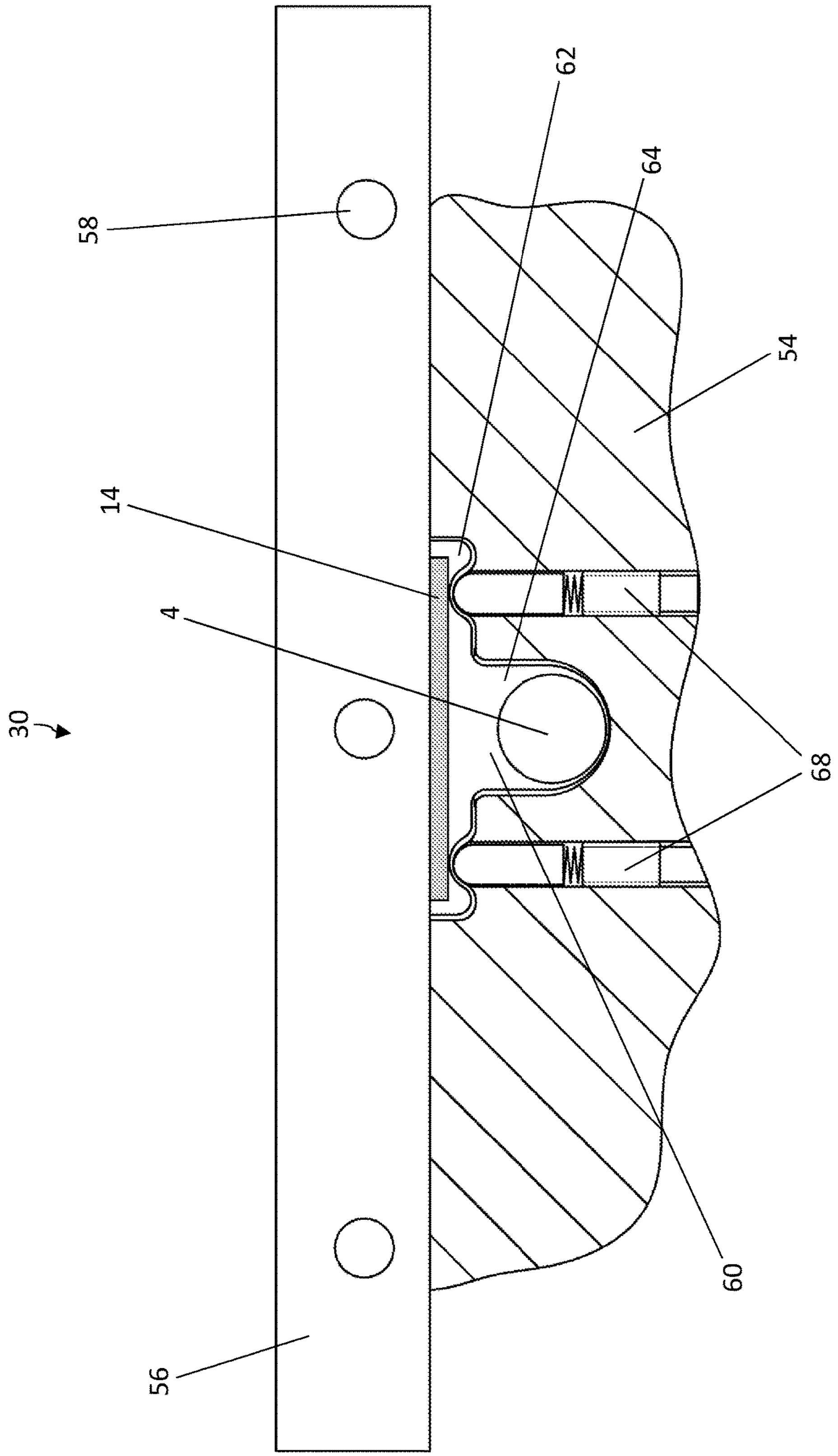
FIG. 16 is a schematic, cross-sectional view of the sealing device of FIG. 15 in a closed sealing position.

The sealing tools 54, 56 shown in FIGS. 15 and 16 correspond substantially to the sealing tools 54, 56 shown in FIGS. 13 and 14. Elements which are the same have been provided with the same reference numbers. As a modification of the embodiment of FIGS. 13 and 14, the projections 66 in the first sealing tool 54 according to the disclosure are replaced by pins 68, which project upward beyond the bottom area of the first recess 62 of the trough 60. The pins 68 serve to support the knobs 50 of the bottom film 6 during the sealing step. The pins 68 can be spring-loaded, as shown. The pins 68 can be mounted in the first sealing tool 54 so that they can be extended.

The knobs 50 in the bottom film 6 preferably have a height in the range of 0.5-5 mm, more preferably of 1-3 mm. Accordingly, the projections 46 in the first forming tool 34 and possibly the projections 66 in the first sealing tool 54 also comprise a height in the range of 0.5-5 mm, preferably in the range of 1-3 mm. If pins 68 are being used, the pins 68 preferably project above the bottom area of the first recess 62 of the trough 60 by a distance in the range of 0.5-5 mm, preferably of 1-3 mm, or they are extended by this amount.

In the embodiments shown, the knobs 50 are illustrated as rounded elevations. Knobs 50 of other shapes are also conceivable, such as knobs 50 with a triangular cross-sectional form with a rounded tip or with a flat plateau surface at the top, on which the strips 14 of active material can rest. The knobs 50 can also be in the form of elongated objects extending along a line (straight or curved). The shape of the projections 46, 66 and/or of the tips of the pins 68 preferably corresponds in each case to the shape of the knobs 50 in the bottom film 6.

Figure 17:
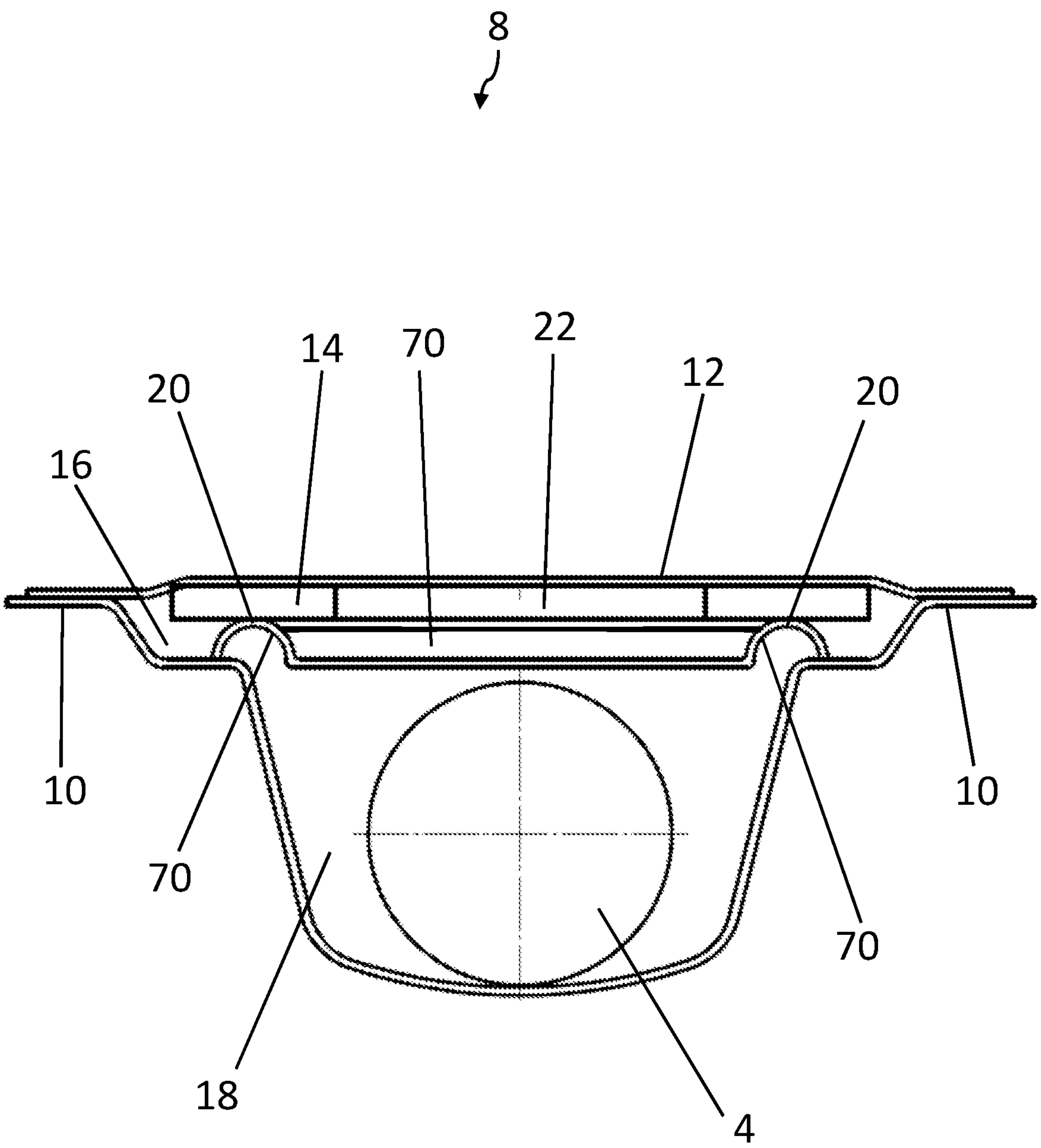
FIG. 17 is a cross-sectional view of a blister pocket of another embodiment of the blister pack according to the disclosure with a sealed-on lidding film.

It is also possible to provide a peripheral rib instead of several knobs 50. This is conceivable especially in the case of the embodiment according to FIGS. 7-9. FIG. 17 shows a cross-sectional view of this modification. The peripheral rib 70, when viewed from above, can have any desired ring-like shape. For example, it can be a circular ring, an oval ring, a polygonal ring, etc.

Figure 18:
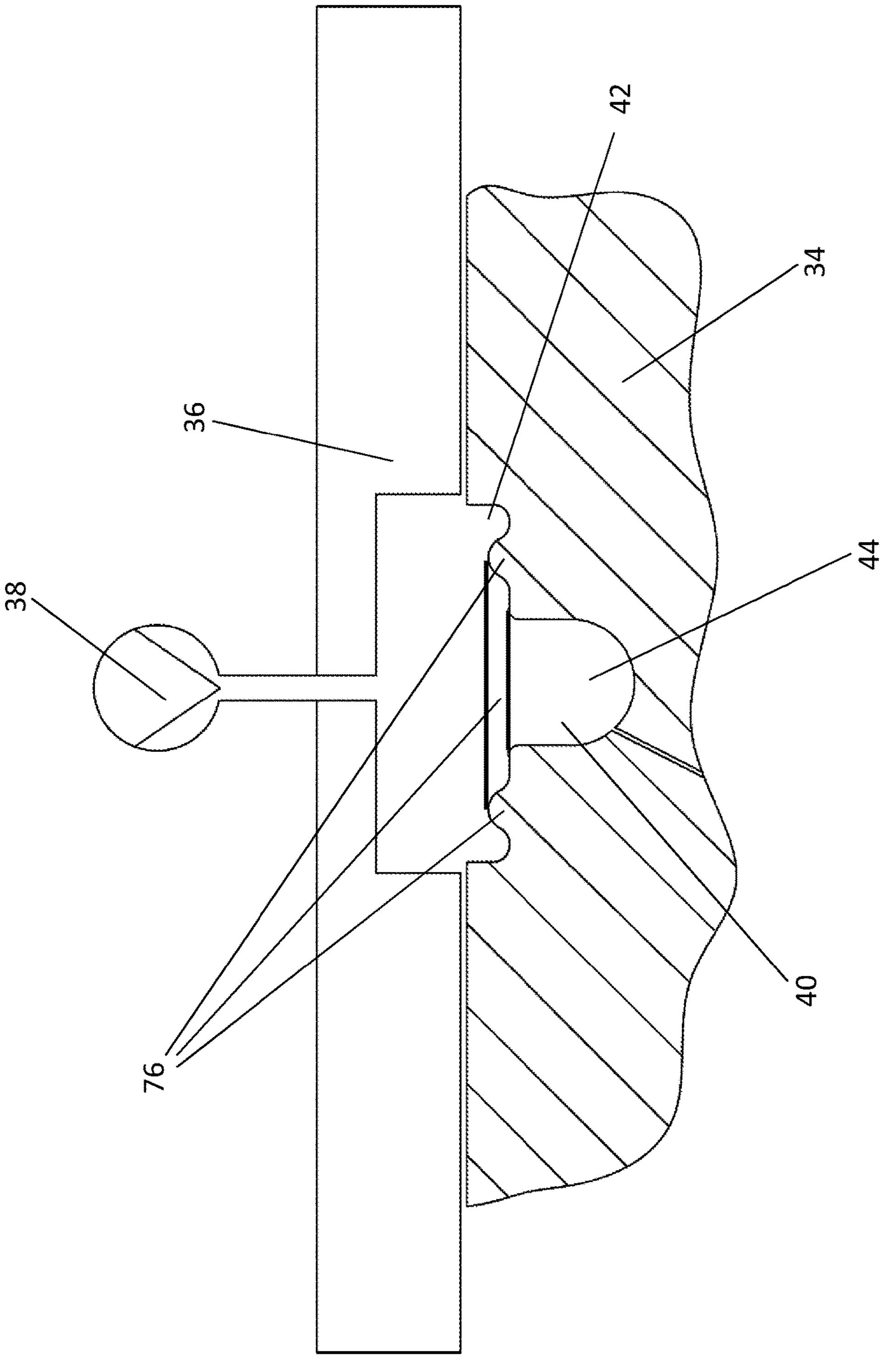
FIG. 18 is a schematic, cross-sectional view of another forming device with a tool according to the disclosure, which can be used to produce the blister packs.

For the production of blister packs like those shown in FIG. 17, the only measure required is to create a peripheral projection 76 in the first forming tool 34 of the same shape as that of the rib 70. FIG. 18 shows a cross-sectional view of a configuration of this type.

Figure 19:
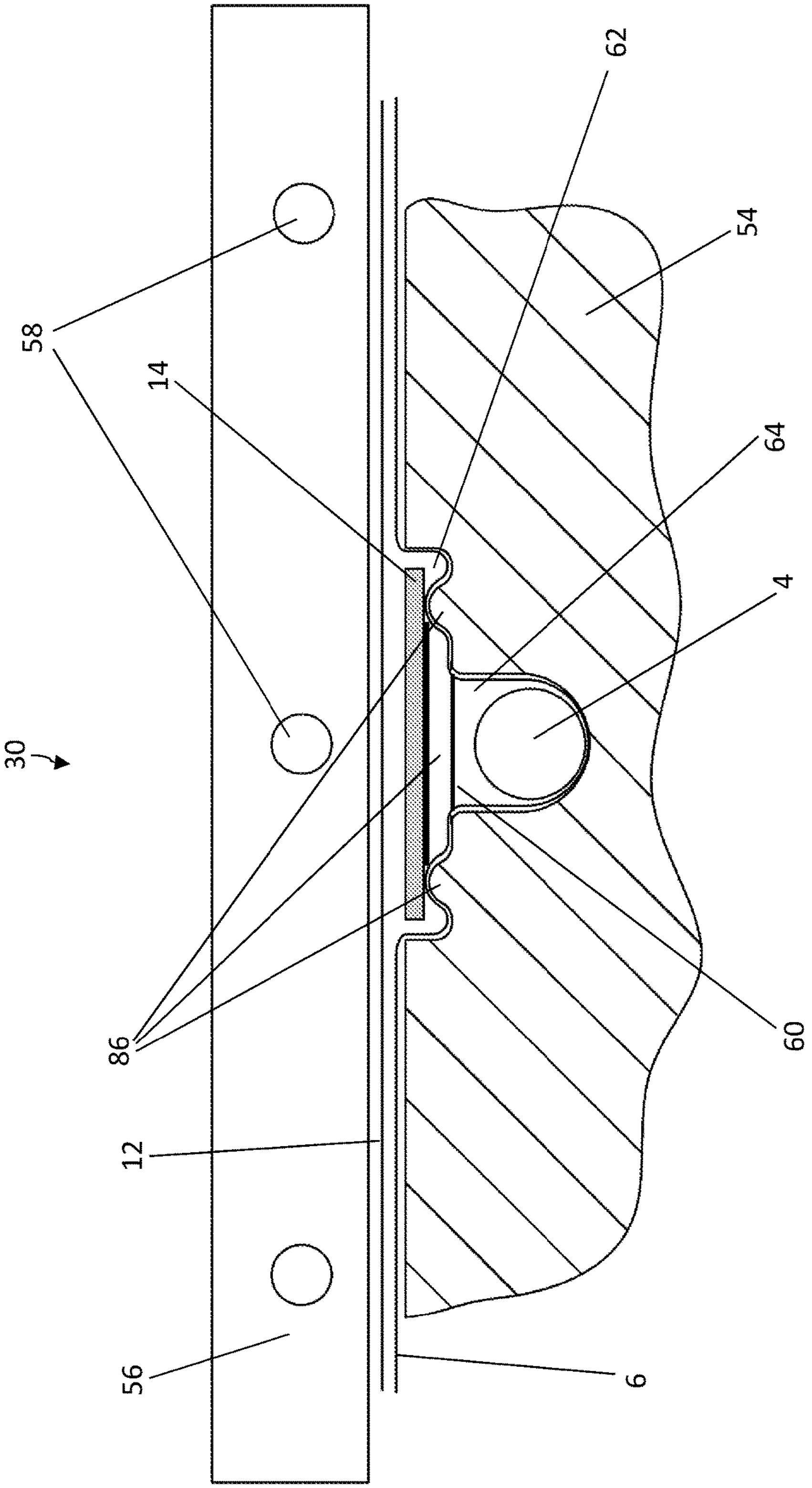
FIG. 19 is a schematic, cross-sectional view of another sealing device with a tool according to the disclosure, which can be used to produce the blister packs, in an opened position.

A peripheral projection 86 of similar shape is preferably also formed in the first sealing tool 54, as can be seen in the cross-sectional view of FIG. 19.

Figure 20:
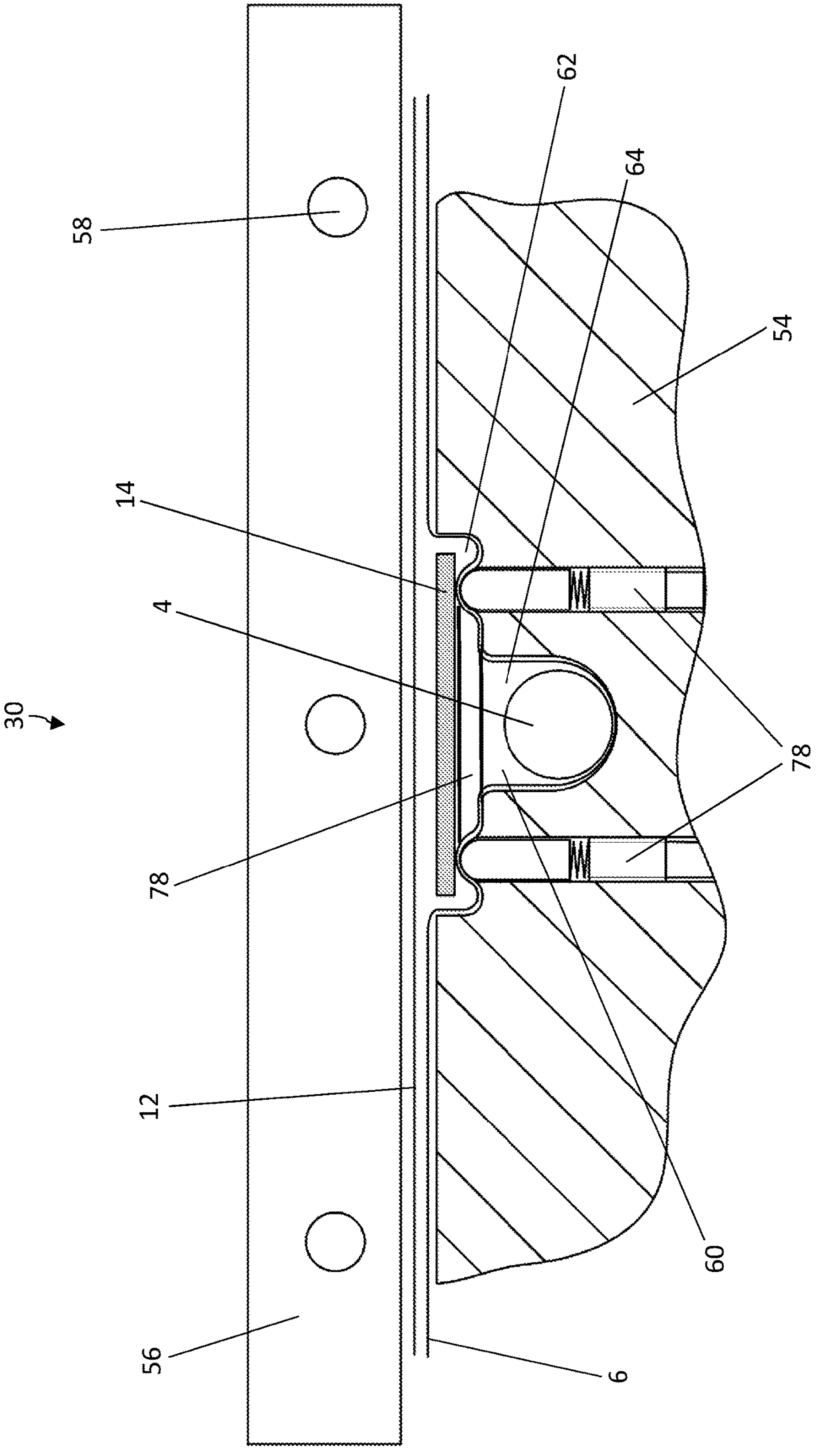
FIG. 20 is a schematic, cross-sectional view of another sealing device with a tool according to the disclosure, which can be used to produce the blister packs, in an opened position.

Alternatively, it would also be possible to use a peripheral, extendable support element 78 in the first sealing tool 54, the apex of which corresponds to the shape of the rib 70. FIG. 20 shows a cross-sectional view of a configuration of this type. The support element 78 is preferably spring-loaded.

With respect to the cross-sectional shape of the rib 70, of the projection 76, of the projection 86, or of the apex of the support element 78, what was said about the cross-sectional shape of the knobs 50 also applies here correspondingly.

The invention claimed is:

1. A blister pack for medicinal products comprising:

a bottom film, in which at least one blister pocket is formed, the at least one blister pocket surrounded by webs of the bottom film, wherein the at least one blister pocket comprises an at least two-level shape with a first recess, which defines a first level of the at least one blister pocket, and a second recess, which is arranged in a subsection of a two-dimensional area over which the first recess extends and is situated lower down than the first recess;

a medicinal product, which is accommodated in the second recess;

a strip of active material, which is arranged in the at least one blister pocket and is accommodated in the first recess;

wherein the first recess comprises, in a bottom area thereof, a peripheral rib extending around the second recess or at least two projecting knobs arranged next to the second recess and a lidding film, which covers the at least one blister pocket and is sealed to the webs of the bottom film, wherein the peripheral rib or the at least two projecting knobs project upwards towards the lidding film, and wherein the strip of active material rests on the peripheral rib or on the projecting knobs and is sealed to the lidding film.

2. The blister pack of claim 1, wherein the peripheral rib is, or the at least two projecting knobs are, formed as an integral part of the bottom film.

3. The blister pack of claim 1, wherein the peripheral rib comprises, or the at least two projecting knobs comprise, a rounding or a flat plateau surface at an apex thereof.

4. The blister pack of claim 1, wherein the strip of active material is a section of a film.

5. The blister pack of claim 1, wherein the strip of active material has a thickness in the range of 0.2-2 mm.

6. The blister pack of claim 1, wherein the peripheral rib has, or the at least two projecting knobs have, a height in the range of 0.5-5 mm.

7. The blister pack of claim 1, wherein the strip of active material, as a result of its material properties, has an absorption function for absorbing at least one substance or a release function for releasing at least one substance.

8. The blister pack of claim 1, wherein precisely two projecting knobs are provided, which are arranged on opposite sides of the second recess.

9. The blister pack of claim 1, wherein the strip of active material is arranged transversely to the medicinal product.

10. The blister pack of claim 1, wherein the strip of active material comprises an opening, which is arranged above the medicinal product.

* * * * *